US009425586B2

(12) United States Patent
Achtstätter et al.

(10) Patent No.: US 9,425,586 B2
(45) Date of Patent: Aug. 23, 2016

(54) METHOD FOR PRODUCING A CORONA IGNITION DEVICE

(71) Applicant: BorgWarner BERU Systems GmbH, Ludwigsburg (DE)

(72) Inventors: Tom Achtstätter, Hemmingen (DE); Timo Stifel, Korntal-Münchingen (DE); Johannes Hasenkamp, Ludwigsburg (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 155 days.

(21) Appl. No.: 14/255,560

(22) Filed: Apr. 17, 2014

(65) Prior Publication Data

US 2014/0310947 A1 Oct. 23, 2014

(30) Foreign Application Priority Data

Apr. 22, 2013 (DE) ......................... 10 2013 104 061
Feb. 21, 2014 (DE) ......................... 10 2014 102 230

(51) Int. Cl.
*H01S 4/00* (2006.01)
*H01T 21/02* (2006.01)
*H01T 13/50* (2006.01)

(52) U.S. Cl.
CPC ................ *H01T 21/02* (2013.01); *H01T 13/50* (2013.01); *Y10T 29/417* (2015.01); *Y10T 29/49002* (2015.01)

(58) Field of Classification Search
CPC .... H01M 2/0426; H01M 2/30; Y10T 29/417; F17C 2203/0391; F17C 3/08
USPC ........................ 29/592.1, 428, 622, 843, 860; 123/143 B, 169 PH, 608, 634; 220/2.2
See application file for complete search history.

(56) References Cited

U.S. PATENT DOCUMENTS

| | | | | |
|---|---|---|---|---|
| 5,344,432 | A | 9/1994 | Slettenmark et al. | |
| 5,386,920 | A * | 2/1995 | Romano | B23K 20/02 220/2.2 |
| 6,109,004 | A | 8/2000 | Bauer et al. | |
| 8,151,781 | B2 * | 4/2012 | Lykowski | H01T 13/04 123/143 B |
| 2005/0269351 | A1 | 12/2005 | Sato et al. | |
| 2006/0249938 | A1 | 11/2006 | Matsuda et al. | |
| 2010/0059975 | A1 | 3/2010 | Sattler et al. | |

FOREIGN PATENT DOCUMENTS

| | | | |
|---|---|---|---|
| CN | 102334252 | A | 1/2012 |
| DE | 26 11 388 | A1 | 10/1976 |
| DE | 41 27 533 | A1 | 2/1993 |
| DE | 42 08 841 | C1 | 8/1993 |
| DE | 197 52 326 | A1 | 5/1999 |
| DE | 10 2006 051 170 | A1 | 4/2008 |
| DE | 60 2005 004 362 | T2 | 1/2009 |
| WO | WO 2010/081124 | A2 | 7/2010 |

* cited by examiner

*Primary Examiner* — Thiem Phan
(74) *Attorney, Agent, or Firm* — Bose McKinney & Evans LLP

(57) ABSTRACT

The invention relates to a method for producing a corona ignition device, in which a center electrode is plugged into an insulator and is connected to a coil, the coil is arranged in a housing tube, a mount for the insulator is fastened to a front end of the housing tube, and a plug connector is fastened to a rear end of the housing tube, and the housing tube is filled with insulating gas. In accordance with this disclosure, the insulating gas is introduced into the housing tube through a bore which is later sealed by welding. In one embodiment, a peg is plugged into the bore to facilitate sealing. In another embodiment, the bore is drilled into the plug connector.

11 Claims, 3 Drawing Sheets

METHOD FOR PRODUCING A CORONA IGNITION DEVICE

RELATED APPLICATIONS

This application claims priority to DE 10 2013 104 061.6, filed Apr. 22, 2013, and DE 10 2014 102 230.0, filed Feb. 2, 2014, both of which are hereby incorporated herein by reference in their entireties.

BACKGROUND

The invention relates to a method for producing a corona ignition device.

Corona ignition devices comprise a housing tube in which a coil is arranged, said coil being connected to a center electrode. The center electrode is stuck in (plugs into) an insulator that is fastened by means of a mount to a front end of the housing tube. At its rear end, the housing tube carries a plug connector, via which the corona ignition device can be connected by means of a suitable mating plug connector to the on-board power supply system of a vehicle.

The center electrode, together with the insulator and the mount, provides a capacitance, which together with the coil forms an oscillating circuit. If the oscillating circuit is resonantly excited, this leads to a voltage step-up between the center electrode and the walls of the combustion chamber or the housing tube of the corona ignition device. This leads to the formation of a corona discharge in the combustion chamber. Fuel in the combustion chamber of an engine can thus be ignited by means of a corona discharge starting from the center electrode.

Compared to conventional spark plugs, which ignite fuel/air mixtures by means of arc discharges, corona ignition devices have the advantage of a much lower burn-up of the electrodes or ignition tips. Corona ignition devices therefore have the potential of a much longer service life compared to conventional spark plugs.

A common cause for premature failure of corona ignition devices are shunts and dielectric breakdowns in the interior of the housing tube. In order to prevent this, housing tubes of corona ignition devices are filled up with electrically insulating casting compound. Another possibility, which is described in EP 1 662 626 B1, consists of filling the housing tube with insulating gas.

SUMMARY

The present invention provides a way in which a corona ignition device having a long service life can be manufactured economically.

According to this disclosure, insulating gas is introduced into the housing tube through a bore. The bore can be drilled into the housing tube or into the plug connector which closes the rear end of the housing tube.

If the bore is drilled into the housing tube, it is typically in a rear end section of the housing tube, specifically behind the rear end of the coil with respect to the longitudinal direction of the housing tube. The rear end is particularly suitable for filling insulating gas into the housing tube since a bore at the rear end can be closed in a gastight manner without impairing the electrical properties of the corona ignition device. When closing a bore, unevenness on an inner surface can only be avoided with difficulty. Any unevenness, edge or the like may lead to a local increase of the electric field and may thus increase the risk of dielectric breakdowns in the interior of the corona ignition device. Field peaks in a portion of the housing tube surrounding the coil therefore lead easily to shunts between the coil and housing tube, that is to say to a premature failure of the corona ignition device. By contrast, field peaks behind the rear end of the coil are largely uncritical due to the greater distance from the coil. Any unevenness behind the rear end of the coil that might be produced when closing an opening is therefore largely unproblematic.

A bore in the plug connector is advantageous since the electric properties of the housing tube are not influenced thereby. In addition, the housing of the plug connector can be manufactured without significant costs with a wall thickness that is greater than the wall thickness of the housing tube. A bore can be welded shut all the more easily, the thicker the wall in which it is located.

In an embodiment of this disclosure, the bore is closed with a peg that is welded to the rim of the bore. The peg can be inserted into the bore before insulating gas is filled into the housing tube. If the peg has a non-circular cross-section it can be plugged into the bore without closing it in a gas-tight manner. Insulating gas can then flow along the peg through the bore. The bore is only closed gas tight when the peg is welded to the rim of the bore. A peg with a non-circular cross-section can be made by pressing a cylindrical pin flat or by cutting a strip from sheet metal, for example.

The bore may also be closed without a peg by welding. However, the bore can usually be closed more reliably in a gas tight manner if a peg is used. This is because insulating gas can react with molten metal and thus cause the weld to become brittle. The material of a peg can be chosen in consideration of the insulating gas so that it does not form a brittle weld. The peg may for example be made of an alloy based on nickel. The tube housing and the plug connector, more precisely the plug connector housing wherein the bore may be drilled, may for example be made of steel. Preferably the peg is made of a different material than the tube housing and/or the plug connector although the peg may also be made of the same material.

The peg may be pressed into the bore. In this case the peg is held in the bore by friction until welding. It is also possible to insert the peg loosely into the bore and to fix it only later by welding.

According to an advantageous refinement of this disclosure, the peg has a head. When the peg is inserted into the bore the head abuts the rim of the bore. The head keeps the peg from being pushed too far into the bore.

For example, nitrogen, carbon dioxide, noble gases and/or sulphur hexafluoride can be used as insulating gas. Helium can be mixed with the insulating gas in order to facilitate a leakage test. Instead of helium, hydrogen can also be used as a tracer gas, for example.

The insulating gas is preferably filled into the housing tube at a pressure of at least 2 bar, preferably at least 4 bar. A gas pressure of preferably at least two bar or more thus prevails in the housing tube of the finished corona ignition device. The higher the gas pressure, the better the electric insulation produced by the insulating gas.

In accordance with an advantageous refinement of this disclosure, air is suctioned from the housing tube before said housing tube is filled with insulating gas. Air is preferably suctioned off through the same bore through which insulating gas is subsequently filled into the housing tube. The gastight closing of the housing tube is thus advantageously easier once the housing tube has been filled with insulating gas. For example, the corona ignition device can be introduced into a pressure chamber which is then evacuated and subsequently flooded with insulating gas. The corona ignition device can be introduced completely into a pressure chamber or may protrude via its front end from the pressure chamber, which then surrounds the housing tube in a gastight manner.

It is also possible however to fill insulating gas into the housing tube through a first bore and to remove air through a second bore. Then two openings must be closed in a gastight manner.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
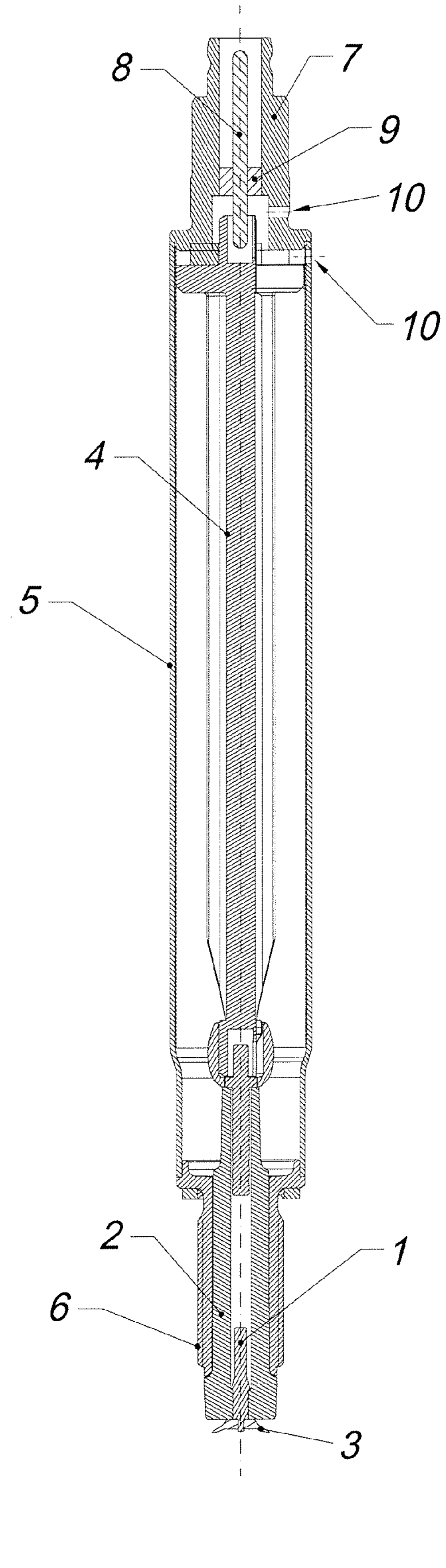
FIG. 1 shows a sectional view of an illustrative embodiment of a corona ignition device.

The corona ignition device shown in FIG. 1 has a center electrode 1, which is surrounded by an insulator 2 and leads to one or more ignition tips 3. The center electrode 1 is connected to a coil 4, which is arranged in a housing tube 5. At its front end, arranged on the side of the combustion chamber, the housing tube 5 carries a mount 6 for the insulator 2, and at its rear end carries a plug connector 7 for connection of the corona ignition device to a voltage source.

The mount 6 surrounds the insulator 2 in a gastight manner and is welded to the housing tube 5. The mount 6 may have an outer thread for screwing into an engine block. Corona ignition devices can also be mounted differently however to an engine block, and therefore an outer thread is not absolutely necessary. The mount 6 is formed in the shown illustrative embodiment as a sleeve which has a smaller outer diameter than the housing tube 5 and has a flange for fastening to the housing tube 5.

A portion of the center electrode 1 can be formed as a glass body which is electrically conductive due to the addition of metal particles or graphite particles and seals off a channel leading through the insulator 2.

The plug connector 7 has a metal housing which forms the outer conductor of a coaxial plug connector, a metal inner conductor 8, and an electrically insulating glass body 9, which seals off an annular gap between the inner conductor 2 and the outer conductor 1. The glass body 9 can form a compression glass seal for the inner conductor 2. In the embodiment, the glass body 9 is used simultaneously as an insulating support for the inner conductor 2, such that it is possible to dispense with further components.

The housing tube 5 is connected in a gastight manner to the outer conductor of the plug connector 7, for example by welding. The inner conductor 8 of the plug connector is connected to the coil 4, for example in that the coil 4 is wound onto a coil former, which, at its end, carries a socket into which the inner conductor 8 is plugged.

The mount 6, together with the center electrode 7 and the insulator 6, forms a capacitor. This capacitor is connected in series with the coil 4 and forms an electric oscillating circuit therewith. By exciting this oscillating circuit, a corona discharge can be generated starting from the ignition tips 3.

In order to reduce the risk of dielectric breakdowns in the interior of the housing tube 1, the housing tube 5 is filled with insulating gas. The gas pressure is increased with respect to the atmospheric pressure, for example to a value of more than two bar. Values from 5 bar to 30 bar are generally well suited.

For example, nitrogen, sulphur hexafluoride, dry air, in particular air with less than 0.001 vol. % of water vapor, noble gas and/or carbon dioxide can be used as insulating gas. Insulating gases such as nitrogen, sulphur hexafluoride and carbon dioxide are particularly well suited. In particular, gas mixtures that contain sulphur hexafluoride, for example 5% (based on the total number of gas molecules or gas atoms) or more, enable excellent gas insulation. In order to facilitate a leakage test, the insulating gas may contain helium. Low helium proportions are sufficient for this, for example 5 less.

The following steps are carried out when producing the corona ignition device: The center electrode 1 is plugged into the insulator 2 and connected to the coil 4, the coil 4 is arranged in the housing tube 5, a mount 6 for the insulator 2 is fastened to a front end of the housing tube 5, and a plug connector 7 is fastened to a rear end of the housing tube 5. These steps are preferably carried out in the above-mentioned order, but can also be carried out in a different order.

After these steps, insulating gas is introduced into the housing tube 5 through a bore 10 that is was drilled either into the plug connector 7 or into the housing tube 5, e.g., in a section behind the rear end of the coil 4 with respect to the longitudinal direction of the housing tube 5. In this context, it should be noted that the term “coil” merely denotes the wire windings themselves. The coil former onto which the coil 4 is wound is not part of the coil.

Two examples of possible positions of such bores 10 are indicated in FIG. 1. The bores 10 in each case can run transverse to the longitudinal direction of the housing tube 5 and may have a diameter from 0.1 mm to 1.5 mm, for example 0.2 mm to 0.5 mm. Air is initially suctioned off from the housing tube 5 through such a bore 10 and the housing tube 5 is then filled with insulating gas. The bore 10 is then sealed by welding.

Figure 2:
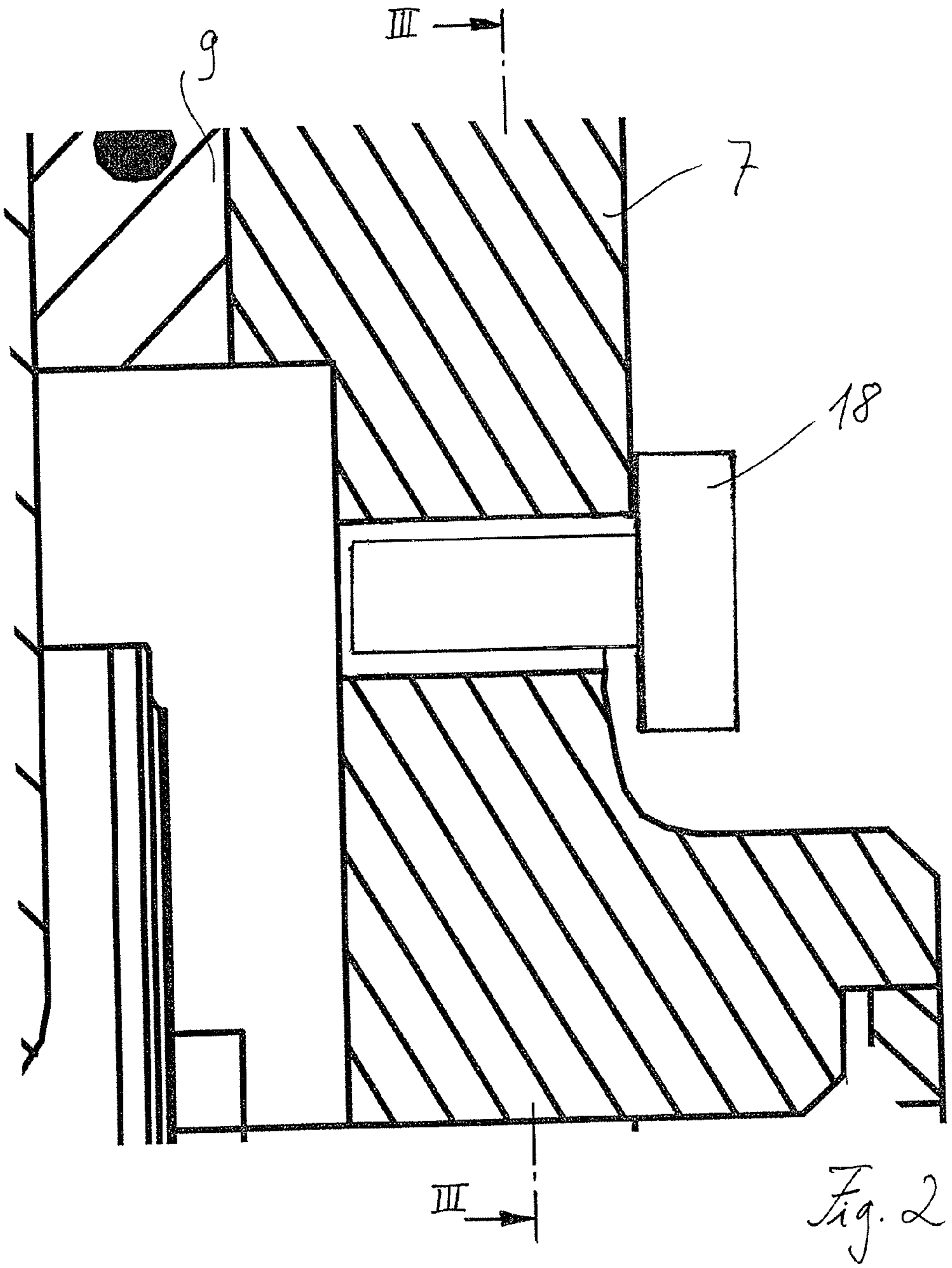
FIG. 2 shows a detail of FIG. 1 with a peg in a not yet sealed bore 10.

The bore 10 can be sealed by welding simply by melting material of the housing tube 5 or the plug connector 7 around the bore 10 without adding additional material or parts. A more reliable sealing can be achieved with a peg 18 that is plugged into the bore 10 as shown in FIG. 2. The bore 10 is then sealed by welding the peg 18 to the rim of the bore 10. In this case material of the peg 18 and of the housing tube 5 or the plug connector 7 is molten to seal the bore 10.

Figure 3:
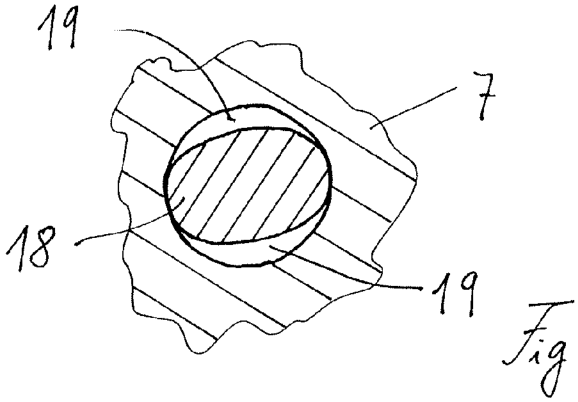
FIG. 3 shows a cross-section along line III-III of FIG. 2.

The peg 18 can be plugged in to the bore 10 before the housing tube 5 is evacuated and then filled with insulating gas if the peg 18 has a non-circular cross-section. Gas can then flow through a gap 19 between the peg 18 and the surrounding wall of the bore 10. The gap 19 is shown schematically in FIG. 3. The peg’s insertion section that is in the bore 10 can be produced from an initially cylindrical section by flattening. For example, a cylindrical peg or section of a peg can be flattened by pressing or hammering. The flattened shape may be an elliptical or angled shape, for example.

The peg 18 has an insertion section that is arranged inside the bore 10 and may additionally have a head that covers a rim of the bore 10. The head of the peg can be shaped like the head of a nail. The length of the insertion section can be shorter than the length of the bore 10. Then the peg 18 does not protrude out of the bore 10 into the interior of the housing tube 5. Thus the peg 18 ends on the inside either flush with the bore 10 or the peg 18 ends inside the bore 10.

The peg 18 can consist of a nickel-based alloy, e.g., Inconel. The tube housing and the plug connector 7, more precisely the plug connector housing wherein the bore 10 may be drilled, can be made of steel, for example.

Figure 4:
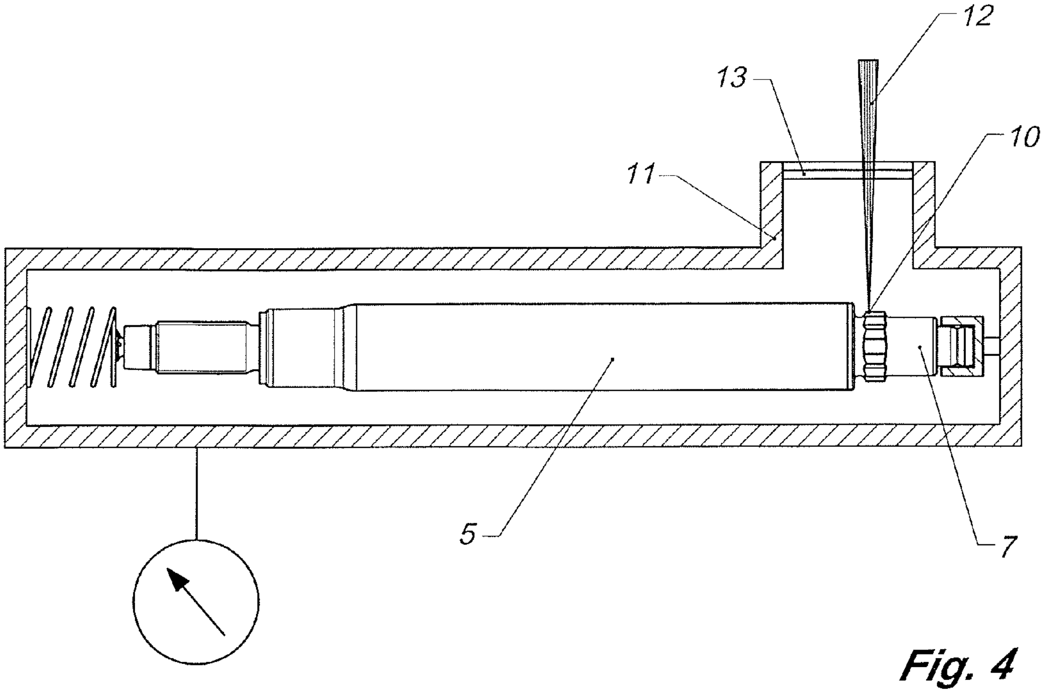
FIG. 4 shows a schematic illustration of the corona ignition device in a pressure chamber for filling with insulating gas.

FIG. 4 schematically shows a corona ignition device which is arranged in a pressure chamber 11 for filling the corona ignition device with insulating gas. In this illustrative embodiment the opening for filling the housing tube 5 with insulating gas is a bore 10 drilled into the plug connector 7. As explained before, the bore may also be drilled into the housing tube 5. A peg 18 is plugged into the bore 10 and the ignition device is then placed in the pressure chamber 11.

The pressure chamber 11 is evacuated, and in so doing air is suctioned off from the housing tube 5. The pressure chamber 11 is then flooded with insulating gas. The bore 10 is then closed by laser welding. To this end, a laser beam 12 is guided through a window 13 into the pressure chamber 11. The pressure chamber 11 may contain a mount for the corona ignition device so that said corona ignition device is positioned precisely for the welding process.

Figure 5:
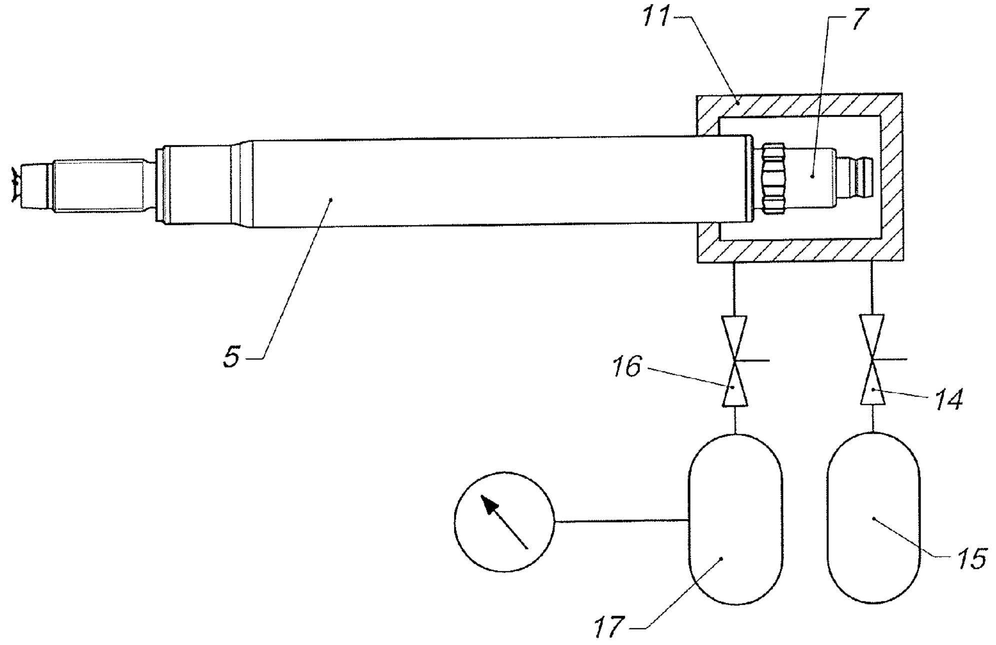
FIG. 5 shows a schematic illustration of the corona ignition device in a further pressure chamber for filling with insulating gas.

FIG. 5 shows a further illustrative embodiment of a corona ignition device with a pressure chamber 11 for filling the corona ignition device with insulating gas. In this illustrative embodiment the corona ignition device protrudes from the schematically illustrated pressure chamber 11. The pressure chamber 11 surrounds the housing tube 5 or an annular area of the plug connector 7 in a gastight manner. The volume of the pressure chamber 11 to be evacuated or to be filled is thus reduced. In the illustrative embodiment of FIG. 4 also, a smaller pressure chamber 11 can be used, from which the corona ignition device protrudes. The part of the corona ignition device protruding from the pressure chamber 11 can be arranged in a second pressure chamber which adjoins the pressure chamber 11. A desired pressure in the pressure chamber 11 can thus be maintained more easily, in spite of any leakage points between the housing tube 5 and a seal of the pressure chamber 11.

In the illustrative embodiments in FIG. 5, air is suctioned out from the housing tube 5 through a bore in the plug connector 7, and insulating gas is then introduced through this bore.

In all embodiments the pressure chamber 11 can be connected to a vacuum chamber 15 via a valve 14, said vacuum chamber having a larger volume than the pressure chamber 11. Since the valve 14 is opened with respect to the vacuum chamber 15, air can be suctioned off very quickly from the corona ignition device. The valve 14 is then closed with respect to the vacuum chamber 15 and a valve 16 is opened with respect to a compressed gas container 17, such that the pressure chamber 11 and the interior of the housing tube 5 are flooded with insulating gas.

The advantage of a vacuum chamber 15 is that a vacuum chamber can be pumped empty continuously by a pump. With a vacuum chamber 15 that is larger than the pressure chamber 11, preferably at least twice as large, air can therefore be suctioned off very quickly from the pressure chamber 11 and the corona ignition device, even with a small pumping capacity, by opening the valve 14 of the vacuum chamber 15. A comparatively quick suctioning-off of air without a vacuum chamber 15 would thus require a much higher pumping capacity.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for producing a corona ignition device, comprising:

plugging a center electrode into an insulator and connecting the center electrode to a coil;

arranging the coil in a housing tube;

fastening a mount of the insulator to a front end of the housing tube and fastening a plug connector to a rear end of the housing tube;

introducing insulating gas in the housing through a bore into which a peg is inserted and filling the housing tube with the insulating gas; and welding the peg to a rim of the bore and thereby sealing the bore;

wherein the housing tube is introduced into a pressure chamber and the housing tube is then filled with the insulating gas; and wherein the pressure chamber has a window through which a laser beam is guided into the pressure chamber to weld shut the bore.

2. The method according to claim 1, wherein the peg is inserted into the bore before the insulating gas is introduced into the housing tube and the insulating gas is introduced into the housing tube through a gap between the peg and a wall of the bore.

3. The method according to claim 1, wherein the bore is formed in the plug connector.

4. The method according to claim 3, wherein peg is formed of a different material then the plug connector.

5. The method according to claim 1, wherein the peg has a head.

6. The method according to claim 1, wherein the peg comprises a nickel based alloy.

7. The method according to claim 1, wherein an end of the peg that is a forward end in the direction of insertion is arranged inside the bore.

8. The method according to claim 1, wherein the peg comprises a section that has a non-circular cross-section, and the peg is pressed into the bore so that the non-circular section is frictionally held in the bore until the bore is sealed by welding.

9. The method according to claim 1, further comprising suctioning air from the housing tube before the step of filling the housing tube with the insulating gas.

10. The method according to claim 9, wherein the pressure chamber is connected via a valve to a vacuum chamber that has a larger volume than the pressure chamber, the method further comprising opening the valve to suction air from the housing tube.

11. The method according to claim 1, wherein the insulating gas contains helium or another tracer gas.

* * * * *